(12) United States Patent
Linden

(10) Patent No.: US 7,428,500 B1
(45) Date of Patent: Sep. 23, 2008

(54) AUTOMATICALLY IDENTIFYING SIMILAR PURCHASING OPPORTUNITIES

(75) Inventor: Greg Linden, Seattle, WA (US)

(73) Assignee: Amazon. com, Inc., Seattle, WA (US)

(*) Notice: Subject to any disclaimer, the term of this patent is extended or adjusted under 35 U.S.C. 154(b) by 1191 days.

(21) Appl. No.: 09/538,679

(22) Filed: Mar. 30, 2000

(51) Int. Cl.
G06Q 30/00 (2006.01)

(52) U.S. Cl. .............................. 705/26; 705/27; 705/37

(58) Field of Classification Search ................... 705/26, 705/27, 37
See application file for complete search history.

(56) References Cited

U.S. PATENT DOCUMENTS

| | | | | |
|---|---|---|---|---|
| 5,488,725 A | * | 1/1996 | Turtle et al. ................. | 395/600 |
| 5,754,939 A | * | 5/1998 | Herz et al. ................... | 455/3.1 |
| 5,761,497 A | * | 6/1998 | Holt et al. ................... | 395/605 |
| 5,835,087 A | * | 11/1998 | Herz et al. ................... | 345/327 |
| 5,848,407 A | * | 12/1998 | Ishikawa et al. ............... | 707/2 |
| 5,870,717 A | * | 2/1999 | Wiecha ....................... | 705/26 |
| 5,915,249 A | * | 6/1999 | Spencer ....................... | 707/5 |
| 6,029,195 A | * | 2/2000 | Herz .......................... | 709/219 |
| 6,092,049 A | * | 7/2000 | Chislenko et al. .............. | 705/10 |
| 6,112,203 A | * | 8/2000 | Bharat et al. .................. | 707/5 |
| 6,161,084 A | * | 12/2000 | Messerly et al. ................ | 704/9 |
| 6,167,398 A | * | 12/2000 | Wyard et al. .................. | 707/5 |
| 6,212,517 B1 | * | 4/2001 | Sato et al. .................... | 707/5 |
| 6,266,649 B1 | * | 7/2001 | Linden et al. ................. | 705/26 |
| 6,295,543 B1 | * | 9/2001 | Block et al. .................. | 707/530 |
| 6,298,344 B1 | * | 10/2001 | Inaba et al. ................... | 707/5 |
| 6,304,854 B1 | * | 10/2001 | Harris ........................ | 705/27 |
| 6,317,722 B1 | * | 11/2001 | Jacobi et al. .................. | 705/14 |
| 6,356,879 B2 | * | 3/2002 | Aggarwal et al. .............. | 705/26 |
| 6,370,525 B1 | * | 4/2002 | Kaufman ...................... | 707/3 |
| 6,421,683 B1 | * | 7/2002 | Lamburt ...................... | 707/104 |
| 6,496,206 B1 | * | 12/2002 | Mernyk et al. ................ | 345/835 |
| 6,609,108 B1 | * | 8/2003 | Pulliam et al. ................ | 705/27 |
| 6,785,671 B1 | * | 8/2004 | Bailey et al. .................. | 707/3 |

OTHER PUBLICATIONS

Amazon.com web pages.*
Yahoo! shopping web pages.*
Ives, Brant; "SBT's Six Plus: Versatile, adaptable acctg. series.", Computer & Software News, V. 6, n. 31, Aug. 1998.*
Dragan, Richard; "Agent Software", PC Magazine, V. 16, n. 6, Mar. 1997.*
Hudson, Marion; "Guide to E-Shopping for Office Supplies", OfficeSolutions, Jan. 2000.*

(Continued)

Primary Examiner—Michael Cuff

(57) ABSTRACT

A facility for identifying purchasing opportunities within a set of purchasing opportunities that are similar to a distinguished purchasing opportunity is described. The distinguished purchasing opportunity has descriptive information associated with it. For each of several terms occurring in this descriptive information, the facility generates a term score. Each term score reflects the extent to which the occurrence of the term and the descriptive information associated with the distinguished purchasing opportunity differentiates the distinguished purchasing opportunity from auto purchasing opportunities in the set. The facility then selects as key words the terms occurring in the descriptive information associated with the distinguished purchasing opportunity that have the highest term scores. The facility identifies purchasing opportunities of the set containing the selected key words, and establishes a purchasing opportunity score for each identified purchasing opportunity by summing the term score of the key words occurring in information associated with the identified purchasing opportunities.

9 Claims, 4 Drawing Sheets

OTHER PUBLICATIONS

Savetz, Kevin; "eShopper: resources for web buying", Jan. 2000.*

"Opensite: Bidstream.com help Web auctions flow more easily", M2 Presswire, Sep. 1999.*

"Premier Online Auction Search and Pricing Guide Gives Sneak Peek", PR Newswire, Mar. 2000.*

"Expertelligence Releases Online Auction Comparison for WebData. com; Compare Selections for Products in Multiple Internet Auction Sites Instantly", PR Newswire, Dec. 1998.*

Maple Drive Lingerie Web Page, archived Mar. 1, 2000.*

Philips Semiconductor Web Page, http://www.kwantlen.bc.ca/electronics/eltn2319/edata/lab/datasheets/compandor571.html, 1998.*

Frakes, William B., "Information Retrieval, Data Structures & Algorithms," Chapters 2 and 3 (pp. 13-43, Prentice Hall, Inc. 1992.

Excite Info: Search Help: Search Results http://www.excite.com/info/search_help/search_results/ [Accessed Mar. 3, 2000].

* cited by examiner

| | purchasing opportunity table |
|---|---|
| Purchasing Opportunity Identifier (411) | Item Description (412) |
| 100976591 (401) | Archie and Jughead ceramic salt and pepper shakers, in original package, perfect condition |
| 210765112 (402) | electric blue ceramic electrical insulator knobs |
| 263018453 (403) | Black and Decker 10 inch circular saw -- available now |
| ⋮ | ⋮ |
| 342108558 (404) | salt and pepper shakers in form of Archie and Jughead -- eat with your Midvale friends! |
| ⋮ | ⋮ |
| 919822507 (405) | Archie and Jughead golf club head covers - Seller in U.K. |
| 997134614 (406) | yoga book by Sam Delta (State Press - 2000) and accompanying Relax CD by artist Sean Stretch |

*Fig. 4*

AUTOMATICALLY IDENTIFYING SIMILAR PURCHASING OPPORTUNITIES

TECHNICAL FIELD

The present invention is directed to the field of electronic commerce, and, more particularly, to the field of purchasing opportunity analysis.

BACKGROUND

Electronic commerce enables computer users to purchase items, such as products and services, on the World Wide Web in a variety of ways using their computers. For example, opportunities to purchase items online include: online stores that are analogous to brick and mortar stores selling large inventories of items at a fixed price, online classifieds that sell a single item at a fixed price, online auctions in which users bid on an item, online reverse auctions in which sellers bid to sell an item to a user, and online purchase aggregation, in which groups of users aggregate their orders for products.

It can be useful for users to be able to identify similar purchasing opportunities, such as different opportunities to purchase the same or similar items. In the case of one-at-a-time purchasing opportunities such as online classifieds, a user may wish to find additional opportunities to purchase the same item where the user needs more than one of the item. For all kinds of purchasing opportunities, a user may wish to (a) price-shop for the same item, or (b) identify similar items that the user might also wish to purchase, either as an alternative to the first item or in addition to it.

Unfortunately, purchasing opportunities are generally not well-organized with respect to these objectives. Indeed, it is common for purchasing opportunities to be organized into general item categories, such as "office supplies" vs. "kitchen implements." In some cases, purchasing opportunities are not organized at all.

Accordingly, a technique for automatically identifying opportunities to purchase similar items on the World Wide Web would have significant utility.

BRIEF DESCRIPTION OF THE DRAWINGS

FIG. 4 is a data structure diagram showing a purchasing opportunity table preferably used by the facility.

DETAILED DESCRIPTION

Figure 1:
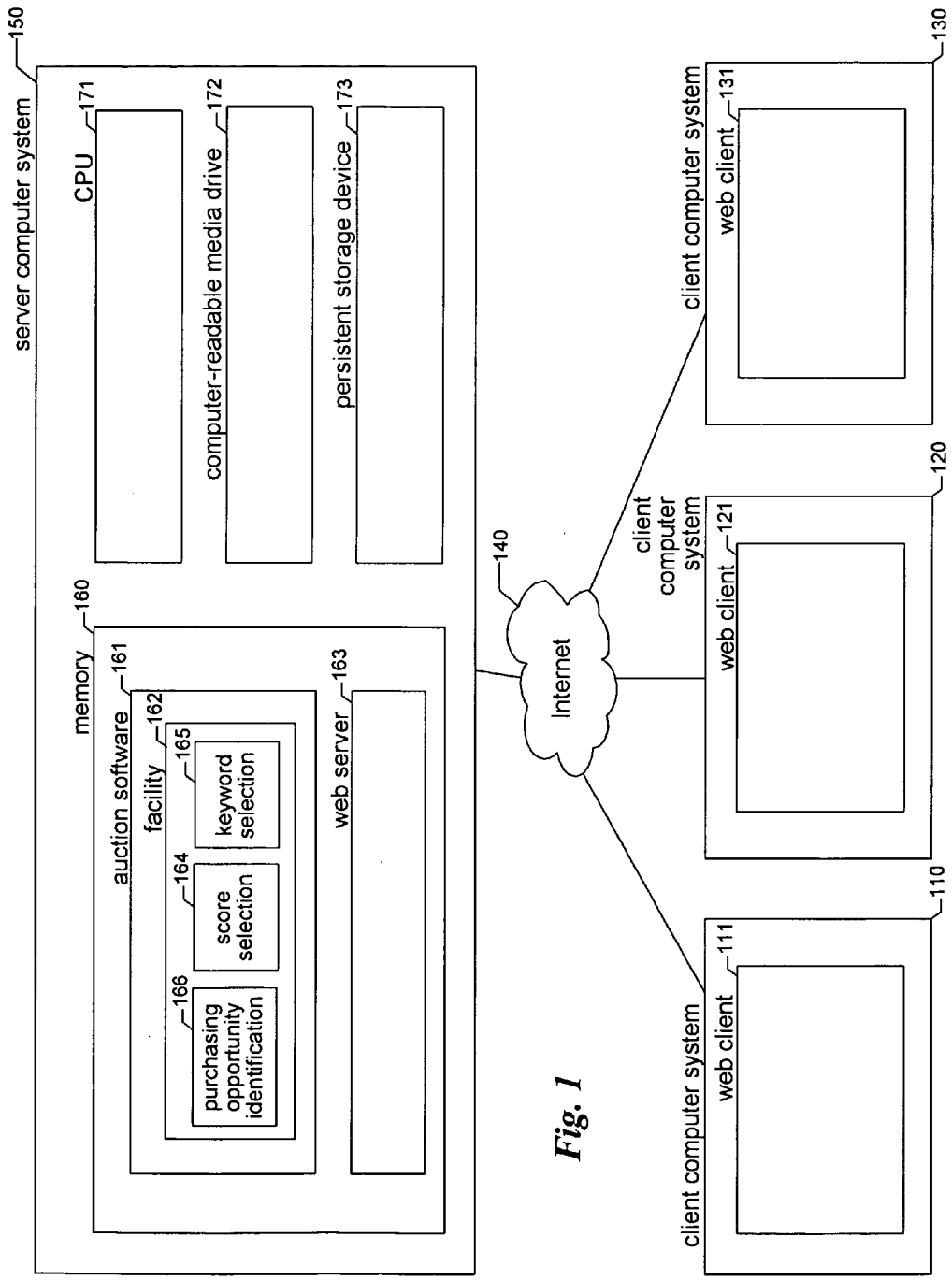
FIG. 1 is a high-level block diagram showing the environment in which the facility preferably operates.

In a preferred embodiment, a software facility for automatically identifying similar purchasing opportunities ("the facility") is provided. For example, for an initial auction, the facility can preferably identify auctions, or purchasing opportunities of other types, that offer the same or a similar item, similar prices or other terms, etc.

The facility preferably uses descriptive information about an initial purchasing opportunity to identify purchasing opportunities that are similar to the initial purchasing opportunity. The descriptive information may include information describing the item offered in the initial purchasing opportunity, as well as information describing other terms of the purchasing opportunity, such as price, availability, seller identity or location, purchasing opportunity type, as well as a variety of other types of information about the initial purchasing opportunity.

The facility first identifies key words occurring in the descriptive information for the initial purchasing opportunity whose occurrence tend to best differentiate the initial purchasing opportunity from others. The facility attributes a score to each key word quantifying this tendency. In a preferred embodiment, the facility identifies key words and attributes scores using the inverse document frequencies of the terms occurring in the descriptive information for the initial purchasing opportunity. The inverse document frequency of a term measures the fraction of occurrences of the term among the descriptive information for all of the purchasing opportunities that occur in the descriptive information for the initial purchasing opportunity. For example, if a particular term occurred three times in the descriptive information for the initial purchasing opportunity and occurred 100 times in the descriptive information for all of the purchasing opportunities, that term would have an inverse document frequency of 3%, or 0.03.

The facility searches the descriptive information for all of the purchasing opportunities to determine, for each key word, which purchasing opportunities' descriptive information contains the key word. In one embodiment, the facility does so by conducting a separate search for each key word, producing, for each key word, a search result containing a list of all of the purchasing opportunities whose descriptive information contain the key word. The facility then generates similarity scores for at least some of the other purchasing opportunities by, for each such purchasing opportunity, summing the scores of key words that occur in the purchasing opportunities.

The purchasing opportunity scores may then be used to order the purchasing opportunities based upon their level of similarity to the initial purchasing opportunity. For example, the facility may order other purchasing opportunities in decreasing order of their similarity to the initial purchasing opportunity. The purchasing opportunity scores may also be used to subset the purchasing opportunities based upon their level of similarity to the initial purchasing opportunity. For example, the facility may subset the other purchasing opportunities to include only the 20 purchasing opportunities that are the most similar to the initial purchasing opportunity, or may subset them to include only the purchasing opportunities that are judged to have at least a 90% likelihood of offering the same item that is offered in the initial purchasing opportunity. By displaying such ordered and/or subsetted lists of purchasing opportunities, the facility enables a user to purchase the same item from multiple sources, price-shop for an item among different sellers and/or purchasing opportunity types, or identify similar items that the user might also wish to purchase, either as an alternative to the first item or in addition to it.

FIG. 1 is a high-level block diagram showing the environment in which the facility preferably operates. The block diagram shows several client computer systems, such as client computer systems 110, 120, and 130. Each of the client computer systems has a web client computer program for browsing the World Wide Web, such as web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably includes auction software 161 incorporating the facility 162, as well as a web server computer program 163 for delivering web pages in response to requests from web clients. The facility 162 may include a term score selection subsystem 164, a key word selection subsystem 165 and a purchasing opportunity identification subsystem 166. While items 161-163 are preferably stored in memory while being used, those skilled in the art will appreciate that these items, or portions of them, may be transferred between memory and a persistent storage device 172 for purposes of memory management and data integrity. The server computer system further contains one or more central processing units (CPU) 171 for executing programs, such as programs 161-163, and a computer-readable medium drive 173 for reading information or installing programs such as the facility from computer-readable media, such as a floppy disk, a CD-ROM, or a DVD.

While preferred embodiments are described in terms in the environment described above, those skilled in the art will appreciate that the facility may be implemented in a variety of other environments including a single, monolithic computer system, as well as various other combinations of computer systems or similar devices connected in various ways.

To more fully illustrate its implementation and operation, the facility is described in conjunction with an example.

Figure 2:
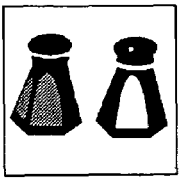
FIG. 2 is a display diagram showing a representative window displayed by the facility.

FIG. 2 is a display diagram showing a representative window displayed by the facility. Window 200 contains descriptive information 210 about a current auction for Archie and Jughead salt and pepper shakers. Information 210 includes such fields as name, current bid, last bid, opening time, closing time, number of bids, starting bid, amount, accepted payment methods, detailed item description, photo, seller identity, shipping fee, customer service policy, and item category. In additional embodiments, other types of data may be included in information 210. The window further includes controls 221 and 222 for bidding on the current auction. A user can use these controls to bid on the auction by typing a bid amount in bid amount field 221, then clicking on "bid" button 222. The window further includes a "see similar auctions" button 223 for displaying information about auctions for similar items. The user may use this control to display information about similar auctions by clicking on the "see similar auctions" button 223. When the user clicks on button 223, the facility analyzes other auctions to identify similar ones. In additional embodiments, the facility can identify auctions for the same item, or purchasing opportunities of various types for the same item or similar items.

Figure 3:
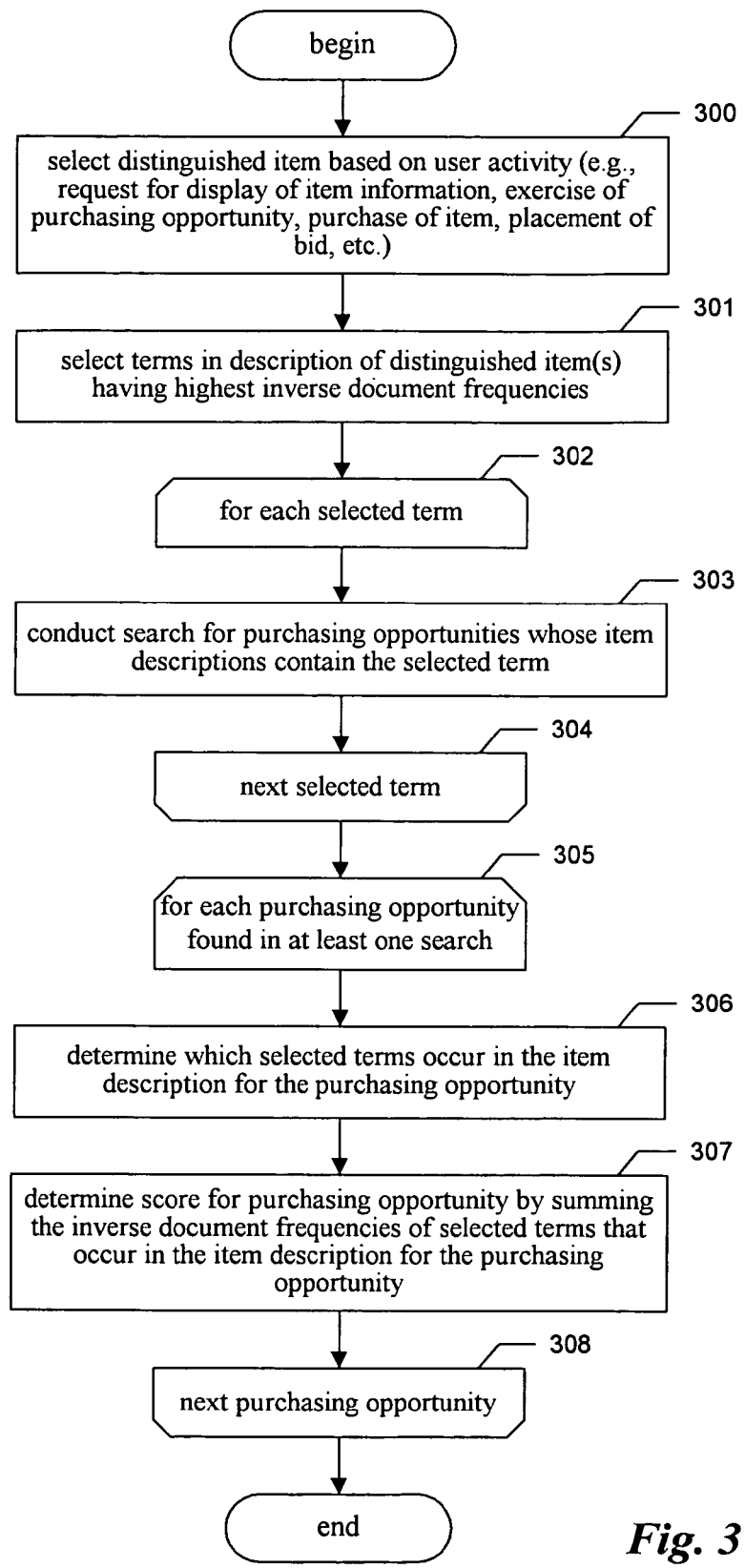
FIG. 3 is flow diagram showing the steps preferably performed by the facility in order to score the similarity of other purchasing opportunities to a distinguished purchasing opportunity.

FIG. 3 is flow diagram showing the steps preferably performed by the facility in order to score the similarity of other purchasing opportunities to a distinguished purchasing opportunity, such as the auction described by information 210. In step 300, the facility selects at least one distinguished item based on some user activity (e.g., requesting display of item information; exercising purchasing opportunity, purchasing item, placing bid, etc.). In step 301, the facility selects terms in the description of the distinguished item or items having the highest inverse document frequencies. In various embodiments, terms are selected from various combinations of fields 210. Steps 302-304 constitute a loop that is repeated for each term selected as a key word in step 301. In step 303, the facility conducts a search for purchasing opportunities whose item descriptions contain the selected term. In step 304, if additional selected terms remain, then the facility continues in step 302 to process the next selected term. Steps 305-308 constitute a loop that is repeated for each purchasing opportunity found in at least one of the searches conducted in step 303. In step 306, the facility determines which selected terms occur in the item description for the purchasing opportunity. In step 307, the facility determines a score for the purchasing opportunity by summing the inverse document frequencies of any of the selected terms that occurred in the item description for the purchasing opportunity. In step 308, if additional purchasing opportunities remain, then the facility continues in step 305 to process the next purchasing opportunity. After step 308, the steps conclude.

FIG. 4 is a data structure diagram showing a purchasing opportunity table preferably used by the facility. Each row in the purchasing opportunity table corresponds to a different purchasing opportunity. As shown, each row in the table contains two fields: a purchasing opportunity identifier field 411 contain an identifier that uniquely identifies the purchasing opportunity of the row, and an item description field 412 that contains a description of the item offered in the purchasing opportunity. For example, in row 401, it can be seen that the Archie and Jughead salt and pepper auction shown in FIG. 2 has purchasing opportunity identifier "100976591," and item description "Archie and Jughead ceramic salt and pepper shakers, in original package, perfect condition."

While the descriptive information used by the facility is shown in a single table having only two columns, is shown as corresponding only to the "Detail" field shown in FIG. 2, those skilled in the art will appreciate that this information could be distributed across a large number of different tables, or even stored in a completely different form. Such tables may contain additional columns other than those shown in FIG. 4 and may be stored in compressed or otherwise optimized form. Further, the descriptive information used by the facility may include additional information associated with each purchasing opportunity in addition to or instead of the contents of the "Detail" field.

In one embodiment, the purchasing opportunity table is derived directly from electronic records of purchasing opportunities managed by the operator of the facility. In an additional embodiment, the purchasing opportunity table is compiled by systematically retrieving and analyzing information describing purchasing opportunities managed by others.

In order to find purchasing opportunities similar to the auction shown in FIG. 2, the facility determines the inverse document frequencies of the words, or "terms," occurring in the item description for the auction in FIG. 2, which is referred to as the "distinguished purchasing opportunity." The result is shown below in Table 1.

TABLE 1

| Term From Item Description for Distinguished Purchasing Opportunity | Inverse Document Frequency in Distinguished Item Description |
| --- | --- |
| Archie | .04123692 |
| and | .00000421 |
| Jughead | .06523911 |
| ceramic | .00127635 |
| salt | .00915263 |
| pepper | .00897250 |
| shakers | .00904123 |
| in | .00000517 |
| original | .00008216 |
| package | .00005972 |
| perfect | .00004257 |
| condition | .00004924 |

The facility uses these inverse document frequencies to identify key words among the terms occurring in the item description for the distinguished purchasing opportunity. In various embodiments, the facility (a) selects any terms having an inverse document frequency higher than a fixed threshold; (b) selects a fixed number of the terms having the highest inverse document frequencies; and (c) selects a fixed percentage of the terms having the highest document frequencies. In the example, the facility utilizes an inverse document frequency absolute threshold of 0.0010000. Accordingly, the facility selects the following terms having inverse document frequencies greater than 0.0010000 as key words, as indicated in Table 1 by the underlining of these terms: Archie, Jughead, ceramic, salt, pepper, shakers.

After identifying the terms listed above as key words, the facility searches the purchasing opportunity table for purchasing opportunities whose items descriptions contain one or more of the key words. In this regard, the facility determines that the item descriptions for the purchasing opportunities having the following purchasing opportunity identifiers contain one or more of the key words: 219765112, 342197558, and 919822507.

The facility next generates a score for each of these three purchasing opportunities by summing the inverse document frequencies of any key words occurring in the item description for each purchasing opportunity. The results are shown below in Table 2.

TABLE 2

| Found Purchasing Opportunity Identifier | Term From Item Description for Found Purchasing Opportunity | Inverse Document Frequency in Distinguished Item Description |
|---|---|---|
| 219765112 | ceramic | .0012735 |
|  |  | .0012735 |
| 342197558 | salt | .00915263 |
|  | pepper | .00897250 |
|  | shakers | .00904123 |
|  | Archie | .04123692 |
|  | Jughead | .06523911 |
|  |  | .13364239 |
| 91982507 | Archie | .04123692 |
|  | Jughead | .06523911 |
|  |  | .10647603 |

The calculated purchasing opportunity scores may be used in a variety of ways. For example, the purchasing opportunity scores may be used to order a list of the found purchasing opportunities from most similar to least similar. In such a list, purchasing opportunity 342197558 would be first, purchasing opportunity 919822507 would second, and purchasing opportunity 219765112 would be third.

The purchasing opportunity scores can further be used to subset the found purchasing opportunities in a variety of ways. For example, the purchasing opportunity scores may be used to subset the list of found purchasing opportunities to include only (a) purchasing opportunities whose scores exceed an absolute threshold; (b) a fixed number of purchasing opportunities having the highest scores; or (c) a fixed percentage of the found purchasing opportunities having the highest scores. In terms of the example, to identify a group of similar purchasing opportunities, the facility preferably employs an absolute threshold of 0.05000000, thereby including purchasing opportunities 342197558 and 919822507 and excluding purchasing opportunity 219765112. In order to identify purchasing opportunities having a high likelihood of offering the same item as the distinguished purchasing opportunity, the facility preferably applies an absolute threshold of 0.11000000, thereby including purchasing opportunity 919822507 and excluding purchasing opportunities 219765112 and 342197558.

It will be appreciated by those skilled in the art that the above-described facility may be straightforwardly adapted or extended in various ways. For example, the facility may be applied to purchasing opportunities of every conceivable sort. Further, the facility may employ a variety of other approaches to assessing term and purchasing opportunity scores. While the foregoing description makes reference to preferred embodiments, the scope of the invention is defined solely by the claims that follow and the elements recited therein.

I claim:

1. A method in one or more computer systems for identifying auctions offering units of the same item, comprising:

displaying information about a first auction, the information including a description of a first item unit offered in the first auction;

receiving user input requesting information about other auctions offering item units that are units of the same item as the first item unit;

determining, for the description of the first item unit among descriptions of item units offered in a group of auctions including the first auction, the inverse document frequency of terms occurring within the description of the first item unit;

selecting a plurality of terms within the description of the first item unit having the largest inverse document frequencies;

for each of the selected terms, conducting a search for auctions in the group whose item descriptions contain the selected term;

for each auction found in at least one of the conducted searches, determining which of the selected terms occur in the auction's item description;

identifying as an auction offering an item unit that is a unit of the same item as the first item unit an auction among the found auctions where the sum of the inverse document frequencies of the selected terms that occur in the item description for the auction exceeds a threshold; and displaying information about the identified auction.

2. The method of claim 1, further comprising displaying information about at least a portion of the found auctions.

3. The method of claim 1 wherein selecting the plurality of terms includes comparing the inverse document frequency of each of the terms occurring within the description of the first item with a minimum threshold.

4. A computer-readable medium whose contents cause one or more computer systems to perform a method for identifying auctions offering units of the same item, the method comprising:

displaying information about a first auction, the information including a description of a first item unit offered in the first auction;

receiving user input requesting information about other auctions offering item units that are units of the same item as the first item unit;

determining, for the description of the first item unit among descriptions of item units offered in a group of auctions including the first auction, the inverse document frequency of terms occurring within the description of the first item unit;

selecting a plurality of terms within the description of the first item unit having the largest inverse document frequencies;

for each of the selected terms, conducting a search for auctions in the group whose item descriptions contain the selected term;

for each auction found in at least one of the conducted searches, determining which of the selected terms occur in the auction's item description;

identifying as an auction offering an item unit that is a unit of the same item as the first item unit an auction among the found auctions where the sum of the inverse document frequencies of the selected terms that occur in the item description for the auction exceeds a threshold; and displaying information about the identified auction.

5. The computer-readable medium of claim 4, the method further comprising displaying information about at least a portion of the found auctions.

6. The computer-readable medium of claim 4 wherein selecting the plurality of terms includes comparing the inverse document frequency of each of the terms occurring within the description of the first item with a minimum threshold.

7. A computer system comprising a processor and memory adapted to perform a method for identifying auctions offering units of the same item, the method comprising:

causing to be displayed information about a first auction, the information including a description of a first item unit offered in the first auction;

receiving user input requesting information about other auctions offering item units that are units of the same item as the first item unit;

determining, for the description of the first item unit among descriptions of item units offered in a group of auctions including the first auction, the inverse document frequency of terms occurring within the description of the first item unit;

selecting a plurality of terms within the description of the first item unit having the largest inverse document frequencies;

for each of the selected terms, conducting a search for auctions in the group whose item descriptions contain the selected term;

for each auction found in at least one of the conducted searches, determining which of the selected terms occur in the auction's item description;

identifying as an auction offering an item unit that is a unit of the same item as the first item unit an auction among the found auctions where the sum of the inverse document frequencies of the selected terms that occur in the item description for the auction exceeds a threshold; and causing to be displayed information about the identified auction.

8. The computer system of claim 7, the method further comprising displaying information about at least a portion of the found auctions.

9. The computer system of claim 7 wherein selecting the plurality of terms includes comparing the inverse document frequency of each of the terms occurring within the description of the first item with a minimum threshold.

* * * * *